US012110857B1

(12) United States Patent
Lindner et al.

(10) Patent No.: US 12,110,857 B1
(45) Date of Patent: Oct. 8, 2024

(54) INTELLIGENT POWER DISTRIBUTION SYSTEM FOR IMPROVING VEHICLE STARTING

(71) Applicant: Knorr-Bremse AG, Munich (DE)

(72) Inventors: Peter Lindner, Rackeve (HU); David Kiss, Szar (HU); Dale B. Garrett, Avon, OH (US); Thomas J. Hayes, Lakewood, OH (US)

(73) Assignee: Knorr-Bremse AG, Munich (DE)

( * ) Notice: Subject to any disclaimer, the term of this patent is extended or adjusted under 35 U.S.C. 154(b) by 0 days.

(21) Appl. No.: 18/643,708

(22) Filed: Apr. 23, 2024

(51) Int. Cl.
*F02N 11/10* (2006.01)
*F02N 11/08* (2006.01)

(52) U.S. Cl.
CPC .......... *F02N 11/108* (2013.01); *F02N 11/087* (2013.01); *F02N 2200/06* (2013.01)

(58) Field of Classification Search
CPC ... F02N 11/108; F02N 11/087; F02N 2200/06
See application file for complete search history.

(56) References Cited

U.S. PATENT DOCUMENTS

2012/0235472 A1 9/2012 Aragai et al.
2023/0216094 A1* 7/2023 Wang .................. H01M 10/615 307/10.7

FOREIGN PATENT DOCUMENTS

DE 10 2013 013 369 B4 5/2022
EP 4 274 047 A1 11/2023
FR 3 055 495 A1 3/2018
WO WO 2023/213488 A1 11/2023

* cited by examiner

*Primary Examiner* — Xiao En Mo
(74) *Attorney, Agent, or Firm* — Crowell & Moring LLP

(57) ABSTRACT

To start a vehicle, power is provided from the vehicle's electrical source to electrical load(s) in the vehicle. Heavy electrical load(s) can sag the vehicle's electrical system and make starting the vehicle difficult. The following embodiments can address this problem by providing an intelligent power distribution system that uses controllable switch(es) to selectively connect load(s) to the vehicle's electrical source in a controlled, progressive manner. Connecting load(s) in a controlled fashion can facilitate the starting of the vehicle by avoiding having electrical load(s) present at start-up.

20 Claims, 4 Drawing Sheets

INTELLIGENT POWER DISTRIBUTION SYSTEM FOR IMPROVING VEHICLE STARTING

BACKGROUND

To start a vehicle, power is provided from the vehicle's electrical system to multiple electrical loads in the vehicle. For example, to start an internal combustion engine, the vehicle's battery provides power to a starter, which starts the engine. The battery can also provide power to other loads in the vehicle (e.g., pumps, controllers, cabin systems, etc.) when the vehicle is started. Batteries in an electric vehicle also provide power to multiple electrical loads when the electric vehicle is started. Irrespective of the type of vehicle, heavy electrical loads can sag the vehicle's electrical system and make starting the vehicle difficult.

SUMMARY

In one embodiment, a vehicle power distribution system is provided comprising: an input configured to receive power from a power source in a vehicle; a plurality of outputs configured to couple with a respective plurality of loads of the vehicle; a plurality of switches associated with the respective plurality of outputs and loads, wherein each switch is configured to selectively close to provide the power received from the power source to its associated output and load; and one or more processors, individually or in combination, configured to, in response to an attempt to start the vehicle: determine whether the power from the power source is stable; and progressively cause the plurality of switches to close to provide power to the plurality of outputs and loads in response to determining that the power from the power source is stable.

In another embodiment, a method is provided that is performed in a vehicle in response to an attempt to start the vehicle. The method comprises: determining whether power received from a power source in the vehicle is stable; and in response to determining that the power received from the power source is stable, causing at least one switch to close to provide the power received from the power source to at least one load of the vehicle.

In yet another embodiment, a vehicle power distribution system is provided comprising: an input configured to receive power from a power source in a vehicle; a plurality of outputs configured to couple with a respective plurality of loads of the vehicle; and means for progressively causing the plurality of switches to close during an attempt to start the vehicle in response to determining that the power from the power source is stable.

Other embodiments are possible, and each of the embodiments can be used alone or together in combination.

DETAILED DESCRIPTION

Introduction

As mentioned above, to start a vehicle, power is provided from the vehicle's electrical source to electrical load(s) in the vehicle. Heavy electrical load(s) can sag the vehicle's electrical system and make starting the vehicle difficult. The below embodiments can address this problem by providing an intelligent power distribution system that uses controllable switch(es) to selectively connect load(s) to the vehicle's electrical source in a controlled, progressive fashion. Connecting load(s) in a controlled, progressive fashion can facilitate the starting of the vehicle by avoiding having too many electrical load(s) present at start-up.

System Overview of Example Vehicle of an Embodiment

Figure 1:
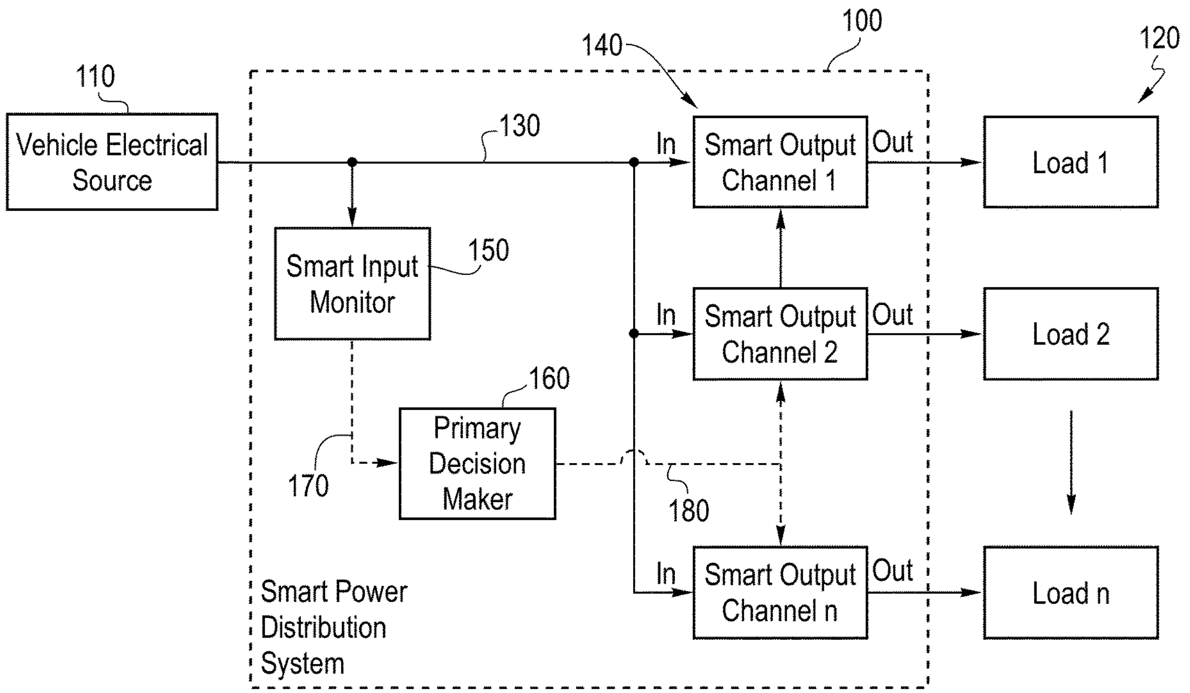
FIG. 1 is a diagram of an intelligent power distribution system of an embodiment with a plurality of smart output channels.

Turning now to the drawings, FIG. 1 is an illustration of an example vehicle of an embodiment. The vehicle can take any suitable form, such as, but not limited to, a car, a truck, a tractor capable of towing a trailer, etc., and can be an electric vehicle, a vehicle with an internal combustion engine, or a hybrid vehicle. The below claims should not be limited to a specific type of vehicle unless expressly recited therein. Furthermore, the terminology used herein is intended to apply to any type of vehicle. For example, the term "crank" is intended to refer to starting an internal combustion engine, a hybrid vehicle, an electric vehicle, etc.

As shown in FIG. 1, in this embodiment, the vehicle comprises a smart power distribution system 100, a vehicle electrical source 110, and a plurality of loads 120 (Load 1, Load 2, . . . Load N). (Other components of the vehicle are not shown in FIG. 1 to simply the drawing.) The vehicle electrical source 110 can take any suitable form, such as, but not limited to, a battery, an alternator, a DC-DC converter (e.g., a 48V-to-24V or 12V converter), etc. Also, the loads 120 can take any suitable form, such as, but not limited to, a starter, vehicle sensors, pumps, compressors, braking controllers, engine controllers, a climate system (e.g., air/heat), an entertainment system (e.g., radio/audio, video, etc.), a navigation system, power seats, windshield wipers, etc.

Figure 2:
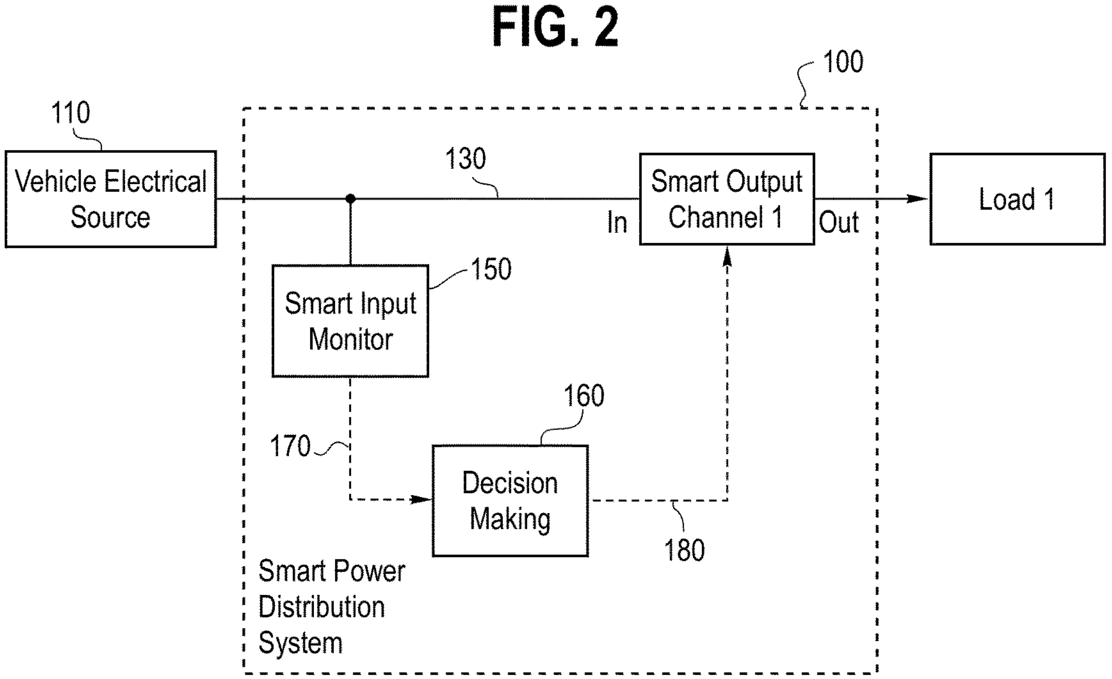
FIG. 2 is a diagram of an intelligent power distribution system of an embodiment with a single smart output channel.

In this example, the smart power distribution system 100 comprises a smart input monitor 150, a primary decision maker 160, and a plurality of smart output channels 140 (Smart Output Channel 1, Smart Output Channel 2, . . . Smart Output Channel n). (In another embodiment (shown in FIG. 2), a single smart output channel is used.) The smart input monitor 150 and the plurality of smart output channels 140 are coupled with the vehicle electrical source 110 via a power line 130, and the smart input monitor 150 and the plurality of smart output channels 140 are respectively coupled with the primary decision maker 160 via (wired or wireless) electrical connections 170 and 180, which in one embodiment are communication channels (e.g., via a communications area network (CAN)), a direct, point-to-point communication channel, such as a universal asynchronous receiver-transmitter (UART) link, etc). In another embodiment the electrical connections 170 and 180 are direct electrical connections that transmit analog or digital voltage.

The smart input monitor 150 can take the form of a sensor that is configured to read the power (or voltage or current) on the power line 130 from the vehicle electrical source 110. As will discussed below, other types of sensors that detect other types of conditions can be used.

The primary decision maker 160 can comprise one or more processors that execute computer-readable program code having instructions (e.g., modules, routines, sub-routine, programs, applications, etc.) that, when executed by the one or more processors, individually or in combination, cause the one or more processors to perform the functions of primary decision maker 160 described herein (and, optionally, other functions). The computer-readable program code can be stored in one or more non-transitory computer-readable storage medium (memories) (inside or outside of the smart power distribution system 100), such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. Alternatively, the primary decision maker 160 can take the form of a purely-hardware implementation (e.g., an application-specific integrated circuit (ASIC)).

Figure 3:
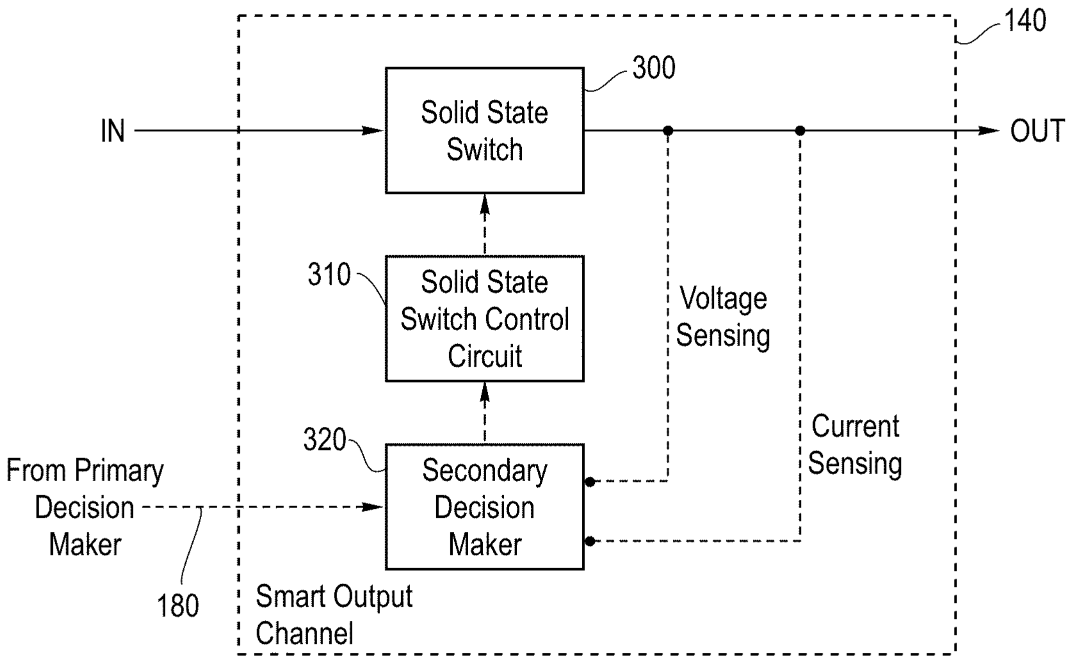
FIG. 3 is a diagram of a smart output channel of an embodiment.

Each smart output channel comprises a switch that is configured to selectively open and close to disconnect and connect, respectively, the vehicle electrical source 110 from/to the smart output channel's load. In this example, the switch is controlled by a control signal provided by the primary decision maker 160 via communication channel 180. FIG. 3 is a diagram of an example implementation of a smart output channel. As shown in FIG. 3, in this example, the smart output channel 140 comprises a solid-state switch 300 (or relay), a solid-state switch control circuit 310, and a secondary decision maker 320. The secondary decision maker 320 is configured to sense the voltage and current of the outputted power. The secondary decision maker 320 provides a control signal to the solid-state switch control circuit 310, which controls the operation of the solid-state switch 300. A more-detailed example of one specific implementation of a smart output channel is provided later in this document.

Overview of Example Operation of an Embodiment

In general, the switches in the smart output channels are used to selectively connect power to the loads at vehicle start up in a controlled, progressive manner. So, instead of reducing the total amount of electrical load by disconnecting loads, in this embodiment, the vehicle starts with no (or a relatively-small number) of loads connected, where the switches in the smart output channels are used to increase the total amount of electrical load by connecting loads in a controlled, progressive manner. It should be noted that the use of the smart output channel ("smart fuse") in this manner is different the use of a conventional mechanical-contactor or thermal-melting fuse that automatically opens in the event of fault.

In one example operation, all of the plurality of smart output channels 140 are initialized as off (disconnected). (Alternatively, all but a relative-small number of smart output channels 140 can be initialized as off.) When power is detected from the vehicle electrical source 110, the smart input monitor 150 measures the power, and the primary decision maker 160 determines whether the power is "stable." Stability can be determined using any suitable criteria, such as, but not limited to a maximum variation in voltage over a given time period. For example, the power can be considered stable if it reaches a steady-state condition of the power not changing more than a certain percentage over time. Stability can be measured in other ways, such as, but not limited to, a gradient of temperature in the vehicle (e.g., the temperature rising at too fast of a rate, which can be an indication of instability) and revolutions per minute (RPM) of the engine (e.g., the RPMs way not be sufficient to turn-over the engine).

When the power is stable, the primary decision maker 160 selectively closes at least one of the smart output channels to provide power to selective ones of the loads at selective times. For example, upon vehicle starting, if the input source signal is considered stable, the primary decision maker 160 can send a control signal on the communication channel 180 to cause the switch in Smart Output Channel 1 to close, thereby connecting the vehicle's electrical source 110 to Load 1. If the input source signal remains stable, the primary decision maker 160 can cause the switch in Smart Output Channel 2 to close to connect the vehicle's electrical source 110 to Load 2. This process of progressively connecting the loads can continue until all output channels are connected and the overall input source remains stable.

The priority of the loads being connected can be determined in any suitable way. For example, relatively-more-critical loads (e.g., loads that are needed to get the engine started, to run diagnostics for the engine, etc.) can be given priority over relatively-less-critical loads (e.g., wiper blades, windows, comfort systems, air ventilation, audio/entertainment, seat adjustments, cabin controls, etc.). As another example, it may be desired to connect the highest-current load first to increase the chance the vehicle can start. Alternatively, it may be desired to connected the load closest to the vehicle's electrical source 110 first. That way, as the electrical system remains stable, loads downstream of the vehicle's electrical source 110 can continue to connect in a controlled and sequenced manner, gradually increasing the total load consumption. Also, the designated loads can be connected in the same order every time the vehicle is started, or the loads can be connected in some other fashion (e.g., prioritized differently for different states or operating conditions of the vehicle).

Figure 4:
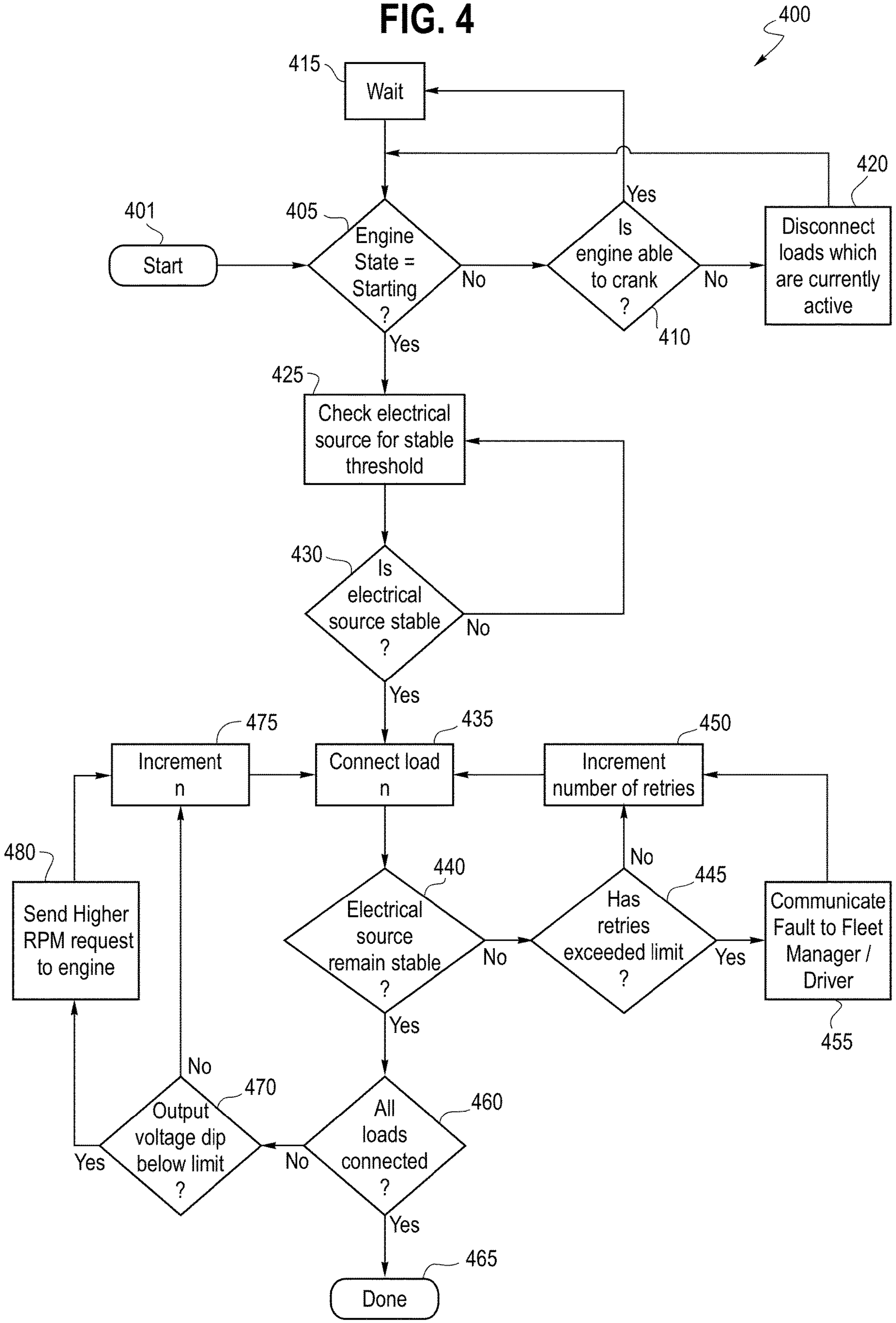
FIG. 4 is a flow chart of a method of an embodiment for improving vehicle starting.

Turning again to the drawings, FIG. 4 is a flow chart 400 of a method of an embodiment for using the intelligent power distribution system 100 for improving vehicle starting. As noted above, this is merely an example implementation, and other implementations can be used. As shown in FIG. 4, at the start (401) of this method, the smart power distribution system 100 determines if the engine is in the starting state (405). If the engine is not in the starting state, the smart power distribution system 100 determines if the engine is able to crank (410). If the engine is not able to crank, the smart power distribution system 100 disconnects loads that are currently active (420), and the method loops back to 405. However, if the engine is able to crank, the smart power distribution system 100 waits (415) and then checks if the engine is in the starting state (405).

If the engine is in the starting state, the smart power distribution system 100 checks (and waits, if needed) for the vehicle electrical source 110 to reach a stable threshold (425 and 430). When the vehicle electrical source 110 reaches a stable threshold, the smart power distribution system 100 connects load n (435) and checks to see if the vehicle electrical source 110 is still stable (440). If the vehicle electrical source 110 is not stable, the smart power distribution system 100 determines if a number of retries has exceeded a limit (445). If the number of retries has exceeded a limit, the smart power distribution system 100 communicates a fault to the fleet manager and/or driver (455). After that (or if the number of retries has not exceeded the limit), the smart power distribution system 100 increments the number of retries (450) and then tries to connect load n again (435).

If the vehicle electrical source 110 is still not stable, the above-described flow is repeated. However, if the vehicle electrical source 110 is still stable, the smart power distribution system 100 determines if all of the loads are connected (460). If all of the loads are connected, the method ends (465). However, if all of the loads are not connected, the smart power distribution system 100 determines whether an output voltage has dipped below a minimum allowable limit (470). If the output voltage has not dipped below the limit, the smart power distribution system 100 increments n, the next load is connected, and the above described flow is performed. However, if the output voltage has dipped below the limit, the smart power distribution system 100 sends a higher revolutions-per-minute (RPM) request to the engine (480) and then increments n (475). The flow proceeds as described above.

There are several advantages associated with these embodiments. For example, with these embodiments, a vehicle can start easier because the in-rush current of the connected loads is not supplied at the same time. Also, by switching on the loads separately, each output channel can be checked before start up to validate that each is working (at least in their steady state). Further, by switching on each contactor separately, each smart fuse can be checked to determine if it is capable of turning on and off. An additional switch off and on can also be applied to check if the smart fuse can disconnect a load in case of failure.

These embodiments also provide advantages over other possible approaches to address the vehicle starting problem. For example, to compensate for the electrical voltage sag, either the source can be intentionally oversized and/or the load can be undersized. However, both methods can decrease system efficiency and practicality. Another approach is to isolate loads at start-up using a fixed delay timer with an electro-mechanical mechanism to connect after the delay has expired. However, this approach lacks a feedback control loop. Further, if the timer expires and the load is too large, the voltage can sag and disconnect the electro-mechanical device and reset. When the timer expires again, the same sag can occur and result in another reset. This oscillating condition risks that the vehicle never starts.

Smart Output Channel Example

Figure 5:
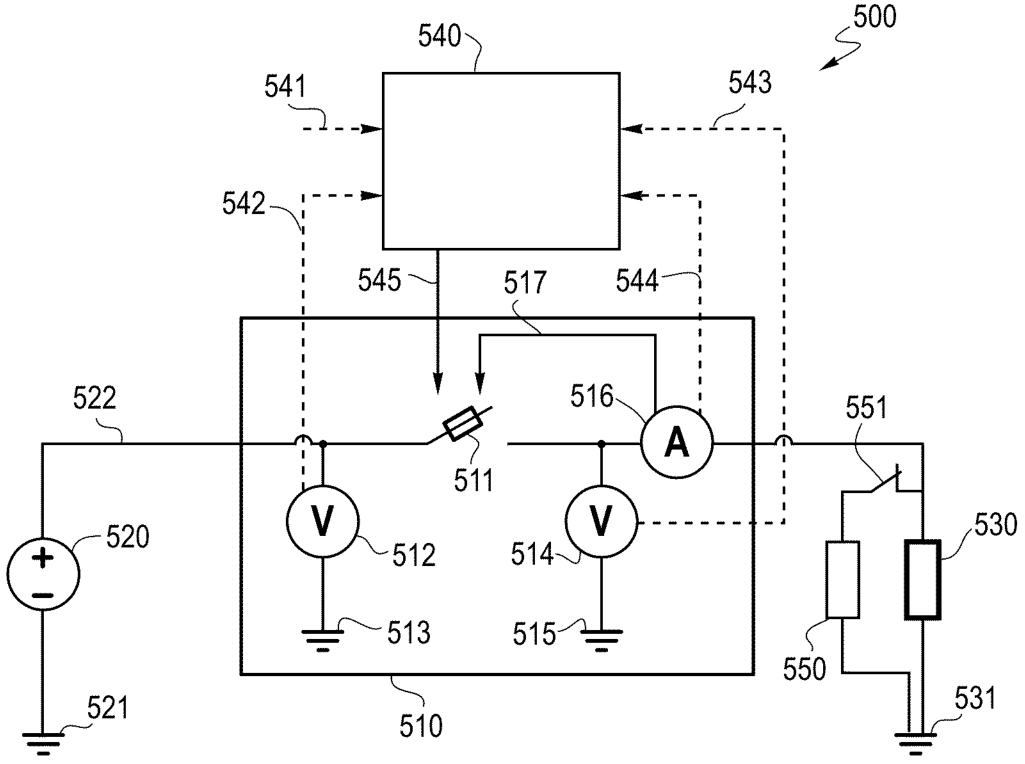
FIG. 5 is a diagram of a switching circuit of an embodiment.

FIG. 5 and the following paragraphs illustrate one example implementation of a smart output channel. It should be understood that this is merely one example and that other implementations can be used. Also, various components of the smart power distribution system 100 from FIG. 1 are not shown in FIG. 5 to simplify the illustration.

As shown in the diagram 500 in FIG. 5, the smart output channel 510 in is located between a power electrical source 520 grounded by ground 521 and a load (consumer) 530 grounded by ground 531. The power source 520 is configured to supply electric power to the load 530 via a power supply line 522. The smart output channel 510 acts as a switching unit disposed in the power supply line 522 to connect and disconnect the load 530 to and from the power source 520.

In the exemplary embodiment, the smart output channel 510 comprises a switch 511 to be opened or closed to connect and disconnect the load 530 to and from the power source 520. The smart output channel 510 further comprises two voltage measurement units 512, 514, each of which being ground by a respective ground 513, 515. However, in alternative embodiments, the system may comprise a common ground instead of separate grounds. Accordingly, any ground 513, 515, 521, 531 shown in the present embodiment may be alternatively provided by a common ground for all components or at least groups of components to be grounded. In a direction from the power source 520 to the load 530, one voltage measurement unit 512 is connected to the power supply line 522 upstream of the switch 511, and the other voltage measurement unit 514 is connected to the power supply line 522 downstream of the switch 511. In the same direction, the smart output channel 510 comprises a current measurement unit 516 downstream of the switch 511, in the given exemplary embodiment downstream of the other voltage measurement unit 514.

The voltage measurement units 512, 514 provide a signal representative of the respective instantaneous voltage to a control unit 540 to control the switch 511 in dependence of set software limits. Specifically, the one voltage measurement unit 512 provides such signal via an upstream voltage signal line 542, and the other voltage measurement unit 514 provides such signal via a downstream voltage signal line 543. In the exemplary embodiment, the control unit 540 is separate from the smart output channel 510. However, in other embodiments, the control unit 540 may be also comprised by the smart output channel 510. Similarly, the current measurement unit 516 provides a signal representative of the instantaneous current via a current signal line 544 to the control unit 540. However, a signal representative of the instantaneous current is also forwarded from the current measurement unit 516 via a switching line 517 of the smart output channel 510 to control the switch 511 as per a set hardware current limit. According to the above, the switch 511 is controlled in accordance with set software limits by the control unit 540 and a set hardware limit by the switching unit. In the control unit 540, the software limits are a software voltage limit and a software current limit representative of an overvoltage and overcurrent, respectively, to protect the consumer against a respective damage. A limit can also be placed on undervoltage. The setting of the software limits is executed via a command signal line 541, which is also capable of transmitting other control commands next to setting commands. The control commands may for example comprise the opening or closing of the switch 511 for other reasons than due to software limits. The control device is configured to compare the received voltage and current signals with the set software voltage limit and the set software current limit. Further, the control unit 540 is configured to consider a time condition in the event of the software voltage limit or the software current level is exceeded by one of the respectively received signals by the voltage measurement units 512, 514 and the current measurement unit 516. For example, a signal to open the switch 511 in response to an overcurrent to be transmitted via a switching line 545 of the control unit 540 is only transmitted after the instantaneous current exceeding the software current limit is detected over a predetermined period of time. Accordingly, short tolerable peaks in voltage and current may be acceptable to avoid a frequent switching. However, in other embodiments, a time condition may not be applied to the software current limit and/or the software voltage limit. The control device is further configured to transmit a signal to the smart output channel 510 to reopen the switch 511 after the instantaneous current signal and voltage signal fall again below the respective software limits, which may be also linked to a time condition.

As the smart output channel 510 and the switch 511, respectively, may provide a sensitivity to electric current different from the load 530 or should be independent thereof, the smart output channel 510 as such also controls the switch 511 in accordance with a hardware limit. Further, the control in accordance with the hardware limit allows the switch 511 to be opened immediately after a critical overload occurs with any further time conditions or the like. The hardware limit is also capable of protecting at least the switching unit, if the control unit 540 fails. The system further comprises a discharge device 550 connected in parallel to the load 530. Consequently, the discharge device 550 is connected to the power supply line 522 between the smart output channel 510 and the load 530 and to the ground 531. The discharge device 550 is configured to remove residual charges stored in the input capacitors of the load 530 when the load 530 is not supplied with electric power from the power source 520. Thus, a faster switch off of the load 530 may be achieved and an unwanted charging up of the capacitors may be prevented.

More information about embodiments that can be used for a vehicle switching unit can be found in PCT Publication No. WO 2023/213488, which is hereby incorporated by reference. The demand signal described therein can be modified for the "vehicle start" application discussed above.

CONCLUSION

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A vehicle power distribution system comprising:

an input configured to receive power from a power source in a vehicle;

a plurality of outputs configured to couple with a respective plurality of loads of the vehicle;

a plurality of switches associated with the respective plurality of outputs and loads, wherein each switch is configured to selectively close to provide the power received from the power source to its associated output and load; and one or more processors, individually or in combination, configured to, in response to an attempt to start the vehicle:

determine whether the power from the power source is stable; and progressively cause the plurality of switches to close to provide power to the plurality of outputs and loads in response to determining that the power from the power source is stable.

2. The vehicle power distribution system of claim 1, wherein none of the plurality of switches are closed when the attempt is made to start the vehicle.

3. The vehicle power distribution system of claim 1, wherein at least one of the plurality of switches is closed when the attempt is made to start the vehicle, and wherein the one or more processors, individually or in combination, are further configured to cause the at least one of the plurality of switches to open in response to determining that an engine of the vehicle is unable to crank.

4. The vehicle power distribution system of claim 3, wherein the at least one of the plurality of switches is associated with a relatively-less-critical load than other loads of the plurality of loads.

5. The vehicle power distribution system of claim 1, wherein the power from the power source is determined to be stable in response to a voltage not varying by more than a threshold over a period of time.

6. The vehicle power distribution system of claim 1, wherein the one or more processors, individually or in combination, are further configured to progressively cause the plurality of switches to close in a same order every time an attempt is made to start the vehicle.

7. The vehicle power distribution system of claim 1, wherein each switch is part of a respective output channel comprising a switch control circuit and a module configured to sense voltage and current outputted from the switch.

8. The vehicle power distribution system of claim 1, further comprising a detector configured to monitor the power received from the power source.

9. The vehicle power distribution system of claim 1, wherein the one or more processors, individually or in combination, are further configured to send a fault message in response to a number of unsuccessful attempts to close one of the plurality of switches.

10. The vehicle power distribution system of claim 1, wherein the one or more processors, individually or in combination, are further configured to send a higher revolutions-per-minute (RPM) request to an engine of the vehicle in response to an output voltage dip below a limit.

11. A method comprising:

performing in a vehicle in response to an attempt to start the vehicle:

determining whether power received from a power source in the vehicle is stable; and in response to determining that the power received from the power source is stable, causing at least one switch to close to provide the power received from the power source to at least one load of the vehicle.

12. The method of claim 11, wherein the at least one switch comprises a plurality of switches and the at least one load comprises a plurality of loads.

13. The method of claim 12, further comprising progressively causing the plurality of switches to close in response to determining that the power from the power source is stable.

14. The method of claim 11, further comprising causing the at least one switch to open in response to determining that an engine of the vehicle is unable to crank.

15. The method of claim 11, wherein the power from the power source is determined to be stable in response to a voltage not varying by more than a threshold over a period of time.

16. The method of claim 1, wherein the at least one switch is part of at least one output channel comprising a switch control circuit and a module configured to sense voltage and current.

17. The method of claim 11, further comprising sending a fault message in response to a number of unsuccessful attempts to close the at least one switch.

18. A vehicle power distribution system comprising:
an input configured to receive power from a power source in a vehicle;
a plurality of outputs configured to couple with a respective plurality of loads of the vehicle; and
means for progressively causing the plurality of switches to close during an attempt to start the vehicle in response to determining that the power from the power source is stable.

19. The vehicle power distribution system of claim 18, wherein the means comprises a smart input monitor, a primary decision maker, and a plurality of smart output channels.

20. The vehicle power distribution system of claim 18, wherein the means comprises a plurality of switches and one or more processors.

* * * * *